(12) United States Patent
Louderback et al.

(10) Patent No.: US 11,288,931 B2
(45) Date of Patent: Mar. 29, 2022

(54) SYSTEMS AND METHODS FOR FACILITATING LOAD CASH TRANSACTIONS WITH A DEBIT CARD AT A POINT OF SALE SYSTEM

(71) Applicant: Walmart Apollo, LLC, Bentonville, AR (US)

(72) Inventors: Andrew B. Louderback, Cave Springs, AR (US); Mark D. Stephens, Rogers, AR (US); Peter H. Blair, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/891,973

(22) Filed: Jun. 3, 2020

(65) Prior Publication Data

US 2021/0383654 A1    Dec. 9, 2021

(51) Int. Cl.
*G07F 19/00* (2006.01)
*G06Q 20/20* (2012.01)

(52) U.S. Cl.
CPC ......... *G07F 19/203* (2013.01); *G06Q 20/202* (2013.01); *G06Q 20/204* (2013.01); *G07F 19/209* (2013.01)

(58) Field of Classification Search
CPC .............................. G07F 19/203; G06Q 20/202
USPC ..................................... 235/379, 492; 705/24
See application file for complete search history.

(56) References Cited

U.S. PATENT DOCUMENTS

| 7,946,477 | B1* | 5/2011 | Ramachandran ..... G07F 19/205 235/379 |
| 8,146,805 | B1 | 4/2012 | Davis |
| 8,958,534 | B2 | 2/2015 | Bodman |
| 9,230,251 | B1 | 1/2016 | Vijayvergia |
| 10,510,069 | B1 | 12/2019 | Phillips |
| 2010/0039666 | A1* | 2/2010 | Tsukada ............... G06Q 20/209 358/1.15 |
| 2016/0342961 | A1 | 11/2016 | Moultrie |
| 2016/0371659 | A1 | 12/2016 | Berry |
| 2017/0076269 | A1* | 3/2017 | Saeed .................. G07G 1/0018 |
| 2017/0195341 | A1 | 7/2017 | Metz |
| 2017/0278183 | A1 | 9/2017 | Snapp |

(Continued)

FOREIGN PATENT DOCUMENTS

JP      2005352808      *   6/2004

*Primary Examiner* — Allyson N Trail
(74) *Attorney, Agent, or Firm* — Fitch, Even, Tabin & Flannery LLP

(57) ABSTRACT

Systems, apparatuses, and methods are provided herein for facilitating financial services through point of sale (POS) systems. A system for facilitating financial services comprises a retail central computer system and a POS system. The POS system is configured to receive an input to switch from a retail mode to a financial services mode, receive, from the card reader, debit card information from a debit card associated with an account of a customer, transmit the debit card information and the cash amount to the retail central computer system, and remove the debit card information from a memory of the POS system. The retail central computer system is configured to encrypt the debit card information received from the POS system, generate a load cash request message, and remove the debit card information from the memory device after encrypting the debit card information.

20 Claims, 7 Drawing Sheets

(56) References Cited

U.S. PATENT DOCUMENTS

2018/0315035 A1\* 11/2018 Johnson ............... H04L 67/02
2019/0147429 A1\* 5/2019 Koh ............... G06K 19/06037
  705/24
2019/0333070 A1\* 10/2019 Lochan Dass ......... G06Q 20/20

\* cited by examiner

SYSTEMS AND METHODS FOR FACILITATING LOAD CASH TRANSACTIONS WITH A DEBIT CARD AT A POINT OF SALE SYSTEM

TECHNICAL FIELD

This invention relates generally to point of sale systems and retail backend systems.

BACKGROUND

Conventionally, point of sale (POS) systems facilitate merchandise purchase transactions by calculating the amount owed by the customer, indicating the amount, providing one or more methods of payment, and preparing an invoice for completed purchases. Cash deposits to a customer bank account typically occur at bank counters or automated teller machines (ATMs) operated by specific financial institutions (FIs).

BRIEF DESCRIPTION OF THE DRAWINGS

Disclosed herein are embodiments of apparatuses and methods for facilitating load cash transactions at POS systems. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein for facilitating financial services at a point of sale (POS) system. A system for facilitating financial services comprises a retail central computer system comprising a control circuit and a memory device and a point of sale (POS) system comprising a user interface device and a card reader. The POS system is configured to receive, from the user interface device, an input to switch the POS system of a retail entity from a retail mode to a financial services mode, display a financial services user interface on the user interface device of the POS system, receive, from the card reader, debit card information from a debit card associated with an account of a customer, the account being managed by a financial institution separate from the retail entity, display a cash amount to load into the account via the user interface device for confirmation, and transmit the debit card information and the cash amount to the retail central computer system and remove the debit card information from a memory of the POS system, display a transaction declined message or a transaction approved message in the financial services user interface based on a response message received from the retail central computer system, and exit the financial services mode and return to the retail mode to process purchases. The retail central computer system is configured to encrypt the debit card information received from the POS system and generate a load cash request message and remove the debit card information from the memory device after encrypting the debit card information.

Figure 1:
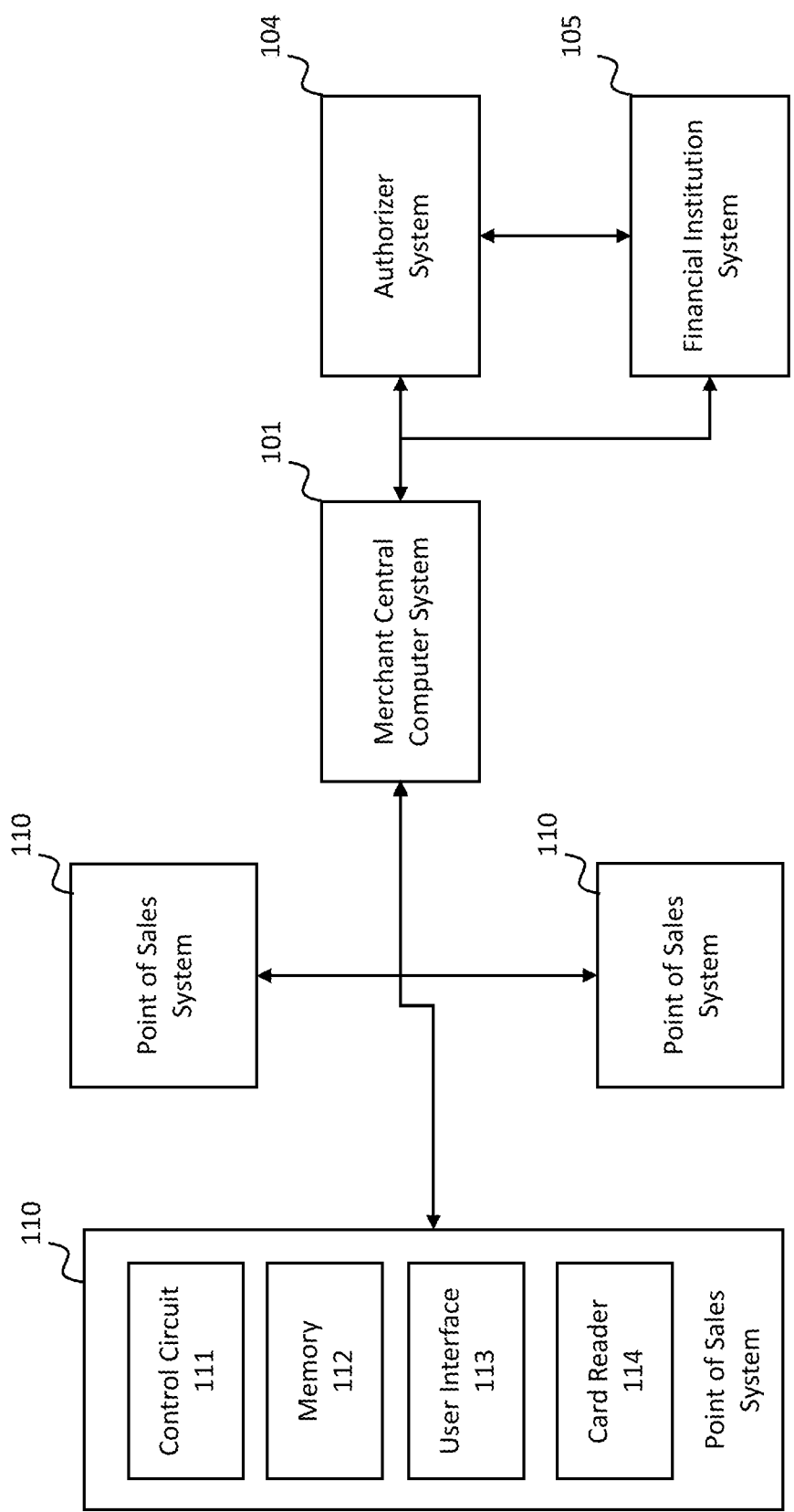
FIG. 1 includes a system diagram in accordance with several embodiments.

Referring now to FIG. 1, a payment system is shown. The system comprises a plurality of POS systems 110 and a merchant central computer system 101 communicating with an authorizer system 104 and/or a financial institution system 105. In some embodiments, one or more components shown in FIG. 1 may communicate over a private network, a virtual private network, a secure network, a Payment Card Industry Data Security Standard (PCI DDS) compliant network, a public network, the Internet, and the like.

The POS system 110 generally refers to a system for carrying out retail transactions such as purchases of goods and/or services. In some embodiments, the POS system 110 may comprise a manned cash register, a self-service checkout terminal, a mobile POS device, and the like. In some embodiments, the POS system may be located on the sales floor of a retail facility, such as a grocery store and a department store. The POS system 110 comprises a control circuit 111, a memory 112, a user interface device 113, and a card reader 114.

The control circuit 111 of the POS system 110 comprises a processor, a microprocessor, a microcontroller, and the like and is configured to execute computer-readable instructions stored in a computer-readable storage memory 112. The computer-readable storage memory 112 may comprise volatile and/or non-volatile computer-readable storage memory and have stored upon it a set of computer readable instructions which, when executed by the control circuit 111, causes the control circuit 111 to facilitate retail purchases and financial service transactions. In some embodiments, the control circuit 111 may provide a financial services user interface via the user interface device 113, receive debit card information from the card reader 114, and communicate with the merchant central computer system 101 to facilitate loading cash into customer accounts. In some embodiments, the control circuit 111 may further use the same user interface device 113 and the card reader 114 to accept payments for retail purchases. In some embodiments, the control circuit 111 of the POS system 110 may be configured to perform one or more steps described with reference to FIGS. 2-4 herein. In some embodiments, a POS system 110 on the sales floor of a shopping facility may comprise a thin client of the merchant central computer system 101 or a stateless edge appliance in which the merchant central computer system 101 performs the function of the control circuit 111 described herein. In some embodiments, the merchant central computer system 101 may be considered part of the control circuit of the POS system 110. In some embodiments, the POS system 110 may comprise a stateless edge appliance is described in United States Patent Application Publication Number 2017/0195341 A1, the entirety of which is incorporated herein by reference. In some embodiments, the POS system 110 may comprise the POS system, or a modified version thereof, described in United States Patent Application Publication Number 2016/0371659, the entirety of which is incorporated herein by reference.

The user interface device 113 refers to an electronic device that allows a store associate and/or a customer to interface with the POS system 110. In some embodiments, the user interface device 113 may comprise an associate-facing and/or customer-facing display screen, touch screen, keyboard, keypad, microphone, speaker, etc. In some embodiments, the user interface device 113 may be configured to display a financial services user interface that prompts for information for the financial service transactions and display messages for confirmation. For example, the user interface device 113 may prompt for information needed to initiate a load cash request, display a cash amount for confirmation, and display whether the transaction has been approved or declined. In some embodiments, the user interface 113 device comprises a number pad configured to allow customers to enter a load cash amount and/or additional information for the load cash transaction, such as customer zip code.

The card reader 114 refers to an electronic device configured to read information from a bank card such as a debit card. In some embodiments, the card reader 114 may comprise a magnetic stripe reader and/or a smart card chip reader. In some embodiments, the card reader 114 may further be configured to retrieve bank card information via near field communication (NFC) from an NCF chip on a bank card and/or from a customer device such as a mobile phone. A debit card generally refers to a debit card issued by a financial institution (e.g. bank, credit union) that provides electronic access to a bank account maintained by the issuing bank or financial institution. A debit card, as used herein, generally refers to a bank-issued debit card different than a prepaid debit card, or a reloadable gift card. A bank-issued debit card is associated with a bank account, and is backed by a customer account (e.g. checking account, money market account) at a bank. In contrast, a prepaid debit card or a reloadable gift card is not backed by a customer account at a bank. The entity issuing and managing the account corresponding to the bank-issued debit card may be different than the entity that is in control of or provides the point-of-sale system. A bank, as used herein, refers to a financial institution that provides various banking services to consumers, such as, maintaining a bank account, depositing funds into a bank account, withdrawing funds from a bank account, issuing a debit card associated with a bank account, and the like. A bank may have physical locations, or may be a virtual bank (e.g. an online bank).

In some embodiments, the POS system 110 may further comprise a cash receptacle for storing cash received from load cash transactions and/or retail purchase transactions. In some embodiments, the POS system 110 may comprise a cash conveyer device configured to determine the cash amount based on cash received from the customer to load into the account. For example, the cash conveyer device may comprise an electronic bill acceptor and/or coin counter configured to accept cash from a customer and deposit the cash into a cash receptacle of the POS system 110. In some embodiments, the POS system 110 may comprise a printer for printing receipts for load cash and/or retail purchase transactions. In some embodiments, the POS system 110 may comprise other devices for facilitating retail purchase transactions such as a barcode scanner and a weight scale.

The merchant central computer system 101 generally refers to a merchant operated processor-based system that supports and processes transactions initiated at the point of sale systems 110 associated with the merchant. In some embodiments, the merchant central computer system 101 may comprise a computer system, a server device, a cloud-based server, a networked computer, etc. In some embodiments, the merchant central computer system 101 may serve a specific store location or comprise a central server system that serves a plurality of geographically dispersed store locations. The merchant central computer system 101 may comprise one or more processor-based devices comprising at least a control circuit, a memory device, and a network interface device. The control circuit of the merchant payment system may comprise a processor, a microprocessor, a microcontroller, and the like and is configured to execute computer-readable instructions stored in a computer-readable storage memory. The computer-readable storage memory may comprise volatile and/or non-volatile memory and have stored upon it a set of computer readable instructions which, when executed by the control circuit, causes the control circuit to communicate with the POS systems 110, the authorizer system 104 and/or the financial institution system 105 to facilitate loading cash into customer accounts. In some embodiments, the merchant central computer system 101 may be configured to perform one or more steps described with reference to FIGS. 2-4 herein.

The authorizer system 104 refers to an electronic system operated by a transaction authorizer that has partnered with financial institutions to process transactions. Generally, an authorizer system 104 may pass information between the merchant and a financial institution and may perform its own compliance verification and fraud detection. However, the transaction authorizer that processes a transaction for a customer account is generally a separate entity from the financial institution that manages the customer account involved in the transaction. An authorizer system may be configured to facilitate transactions for a plurality of merchants and/or financial institutions. An authorizer may be referred to as a third-party service provider that provides authorization and settlement services to the retailer. In some embodiments, a transaction authorizer may be a financial service gateway vendor, Examples of current financial service gateway vendors may include Green Dot Corp., First Data Corp., Interactive Communications International, Inc., Vantiv Inc., MoneyGram International Inc., Ria Money Transfer, and the like.

The financial institution system 105 refers to an electronic system operated by a financial institution such as a bank or a credit union. The financial institution is configured to process and respond to transaction requests involving accounts managed by the financial institution. The account involved in a load cash request is generally an account associated with a debit card and may be a checking account, a savings account, a money market account, and the like. In some embodiments, the account may be owned by an individual, jointly owned by several individuals, or owned by a business entity associated with the debit card.

In some embodiments, the merchant central computer system 101, the authorizer system 104, and/or the financial institution system 105 may further communicate with a payment network including a payment processor system to process load cash requests. A payment network may refer to an entity, a company unit, or company that provides processing services for retailers and banks to effectuate point-of-sale transactions on behalf of consumers. The payment network provides a secure connection to a subset of banks.

Examples of payment networks are, but not limited to, NYCE Payment Network, LLC, STAR Network, MasterCard Inc., Visa Inc., Discover, American Express Co., and the like.

In some embodiments, the merchant central computer system 101 may communicate with only one of the authorizer system 104 and the financial institution system 105. For example, a merchant may be partnered with a financial institution and directly communicate load cash requests to the financial institution without involving a third-party authorizer/vendor. In some embodiments, the merchant central computer system 101 may communicate with both an authorizer system 104 and a financial institution system 105 to process different load cash requests. For example, the merchant may directly submit load cash requests for debit card information associated with one financial institution while using an authorizer for debit card information associated with another financial institution. In some embodiments, the merchant central computer system 101 may communicate with a plurality of authorizer systems 104 and/or financial institution systems 105. For example, the merchant central computer system 101 may select a specific authorizer or financial institution as the recipient of the load cash request based on the Bank Identification Number (BIN) or other information in the debit card information. In some embodiments, the merchant central computer system 101 may maintain a list of registered BINs and the associated process (e.g. required information, destination of transaction request) for each registered BIN. In some embodiments, the merchant central computer system 101 is configured to delete customer debit card information (e.g. card number, account number) from all devices associated with the merchant (e.g. POS system, customer database, transaction records, long term storage memory) before or upon the termination and/or completion of each load cash transaction.

Figure 2:
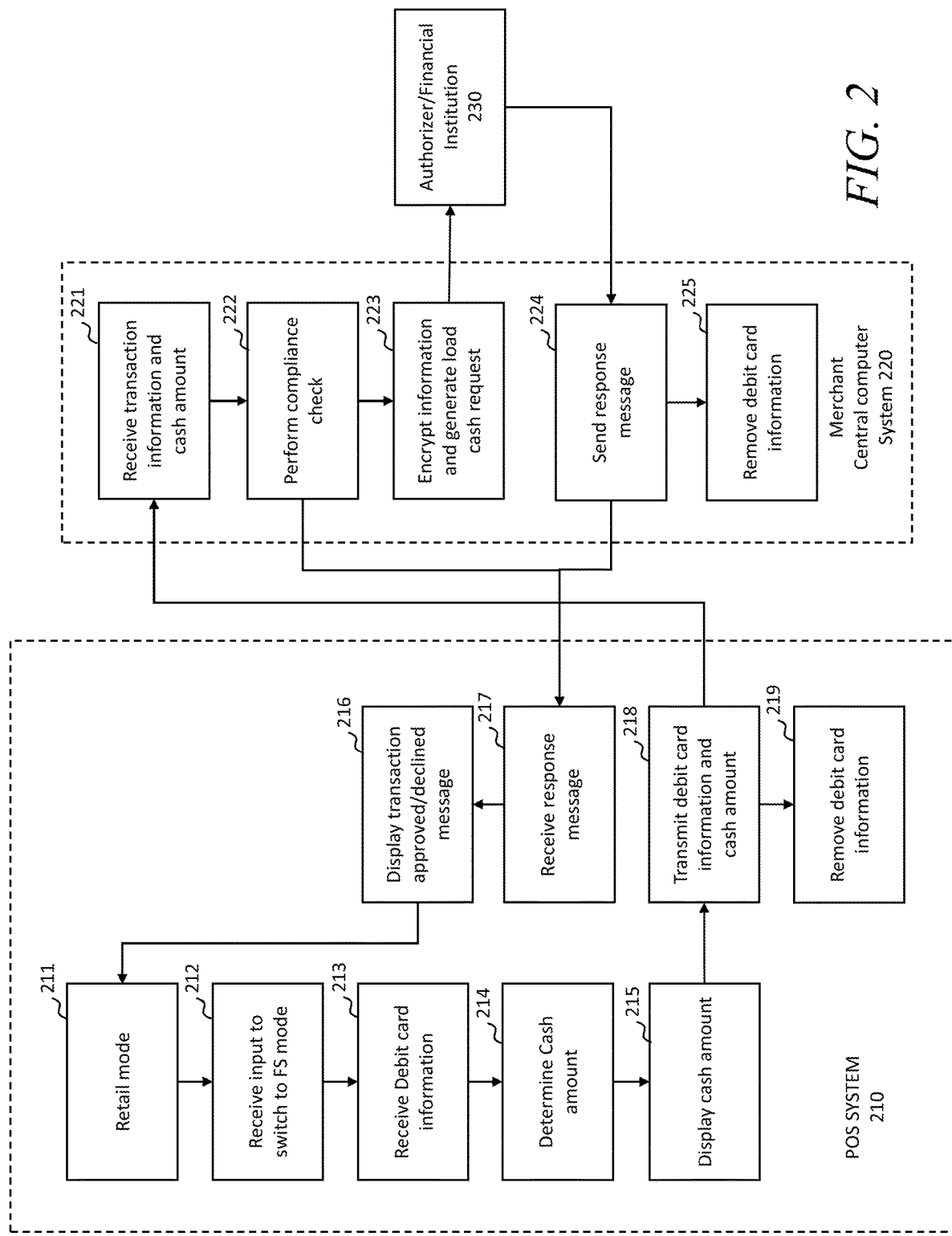
FIG. 2 includes a flow diagram in accordance with several embodiments.

Referring now to FIG. 2, a process for facilitating loading cash to a customer account at a POS system is shown. In some embodiments, the POS system 210 may comprise the POS system 110 described with reference to FIG. 1 or a similar system. In some embodiments, the merchant central computer system 220 may comprise the merchant central computer system 101 described with reference to FIG. 1 or a similar system.

In step 211, the POS system is in the retail mode. The retail mode generally refers to a state of the POS system 210 that is configured to identify items, calculate purchase cost, and receive payment for purchase of merchandise or service. In some embodiments, the retail mode may correspond to displaying a user interface to a store associate or a customer for scanning items for purchase and/or submitting payment for retail purchase. In step 212, the POS system 210 receives an input to switch from a retail mode to a financial services mode. The financial services mode generally refers to a state of the POS system 210 that is configured to accept information for facilitating financial services. The financial services mode may comprise a display of a financial services user interface that prompts for information and provides options related to financial services such as loading cash into a customer account. In some embodiments, the input to switch to a financial services mode may comprise entering in a specific code, selecting an icon or a menu option in the graphical user interface, selecting a tab in the graphic user interface, selecting an icon to open a window in the graphic user interface, pressing a button on a keypad/keyboard, scanning a specific barcode, and the like.

In step 213, the system receives debit card information from a debit card of a customer. In some embodiments, debit card information may comprise one or more of cardholder name, debit card number, expiration date, and the like. Generally, debit card information may comprise any information that a card reader may retrieve from a magnetic stripe, a smart chip, or an NFC tag on a debit card. In some embodiments, the debit card information may be received via performing NFC scan of a mobile device at a card reader. In some embodiments, after step 213, the POS system 210 and/or the merchant central computer system 220 may determine whether additional information is required for loading cash into an account associated with the received debit card information. In some embodiments, the BIN number in the received debit card information may be used to determine whether and what additional information is required. For example, an authorizer or a financial institution associated with the debit card may require a zip code associated with the customer account to authorize the transaction. The POS system 210 may then prompt for additional information associated with the debit card information via a user interface device (e.g. display screen, touch screen, keypad) and send the additional information to the central computer system.

In step 214, the system determines the cash amount to load into the customer account. In some embodiments, a customer may hand cash to a cashier who counts the cash and enter the amount via the financial services user interface. In some embodiments, the customer may enter the amount via a user interface of the POS and the cashier may verify the amount with the cash received. In some embodiments, the POS may comprise a cash conveyer device (e.g. automated bill/coin acceptor) configured to determine the cash amount based on cash (e.g. bills and coins) received from the customer. In step 215, the cash amount determined in step 214 is displayed to the customer and/or the cashier for confirmation. In step 218, the POS system transmits the debit card information, any additional information associated with the debit card, and the cash amount to a merchant central computer system 220.

In step 219, the POS system 210 removes debit card information from its storage memory. As used herein, removing information from a computer storage memory may comprise overwriting the memory sectors storing the information or removing a pointer to the memory sectors to and mark the sectors containing the information as available for overwriting. In some embodiments, the debit card information may be removed in response to receiving a confirmation that the merchant central computer system 220 has received the debit card information. In some embodiments, the debit card information may be encrypted at the POS system 210 before being transmitted to the merchant central computer system 220 and the debit card information may be removed from the POS in response to the completion of the encryption. In some embodiments, the debit card information may be retained until the completion of the transaction at step 216. In some embodiments, the POS may confirm the removal of the debit card information before completing the transaction and/or returning to retail mode.

In step 221, the merchant central computer system 220 receives the debit card information, the cash amount, and any additional information. In some embodiments, the merchant central computer system 220 may determine the required additional information associated with the debit card information. In some embodiments, the merchant central computer system 220 may use the BIN in the debit card information to determine the transaction requirements associated with the debit card information. Transaction requirements may comprise one or more of required additional information, transaction request recipient, transaction request message format, transaction request message content, maximum cash amount per transaction, and the like. In some embodiments, the system may first determine whether the required information (e.g. zip code) had been stored in a customer database or a transactions database from a previous transaction. For example, the customer may have previously scanned a club card or customer loyalty card at the POS system, and customer information associated with the user account of the customer may be used to supply the additional information required for the transaction request. In some embodiments, the previous transaction may be a retail transaction or a financial service transaction. The previously stored information may be used to generate the load cash request in step 223. If the required information is not available, the merchant central computer system 220 may cause the POS system 210 to prompt for additional information. The merchant central computer system may then include the additional information received from the POS in the load cash request. In some embodiments, the additional information may be provided by the authorizer and/or the financial institution to complete the transaction.

In step 222, the merchant central computer system performs a merchant level compliance check. In some embodiments, the system is configured to determine whether loading the cash amount to the account of the customer complies with retailer, authorizer, FI, or government regulation and rules based on one or more of the cash amount and transaction history associated with the customer. For example, the merchant system may impose a per-transaction maximum (e.g. $100, $500) for loading cash at a POS system. In some embodiments, step 222 may be performed at the POS system 210 or may be omitted. For example, the merchant central computer system 220 may rely on an authorizer and/or a financial institution to verify rule and regulation compliance of the load cash request. If the load cash request does not pass the compliance check (e.g. cash amount exceeds limit), the merchant central computer system 220 may send a transaction declined message to the POS system 210 without sending a load cash request to an authorizer or a financial institution 230. The transaction decline message may indicate the reason for the failed transaction.

In step 223, the system encrypts debit card information and any additional information, generates a load cash request, and sends the request to an authorizer or a financial institution 230. In some embodiments, the system may determine which authorizer or financial institution to send the load cash request based on the debit card information. For example, the BIN in the debit card information may be used to select the specific authorizer or financial institution associated with the BIN. In some embodiments, the load cash request is sent in response to receiving the debit card information from a POS system 210 and is not batched with other requests such that a response message may be received while the customer waits at the cash register. In some embodiments, the load cash request may comprise an ISO 8583 message or other standardized messages. An example of the content of a request message is shown in FIGS. 5A, 5B, and 5C.

In step 224, the merchant central computer system 220 receives a transaction authorized or declined message from the authorizer or the financial institution 230 and sends a response message to the POS system 210 according to the received message. In some embodiments, the cash amount becomes available in the customer account upon the transaction being authorized by the financial institution 230. The authorizer/financial institution 230, and the merchant central computer system 220 may settle the balances at a later time.

In step 225, the merchant central computer system removes debit card information from storage memories associated with the merchant. In some embodiments, step 225 may be performed in response to receiving a confirmation that the response message has been received at the POS system 210. In some embodiments, step 225 may be performed earlier, for example, immediately after encrypting the information in step 223 or in response to a confirmation that the load cash request is received at the authorizer/financial institution 230. In some embodiments, the system may encrypt the debit card information upon receiving the information from the POS system 210 and does not store it in any long term or non-volatile memory device. In some embodiments, step 225 may comprise a confirmation that the debit card information has been removed prior to allowing the process to proceed or terminate. For example, the system may first confirm that debit card information has been removed before sending the response message in step 224 or displaying the transaction approval/decline message in step 216. In some embodiments, step 225 may include removing the debit card information and its association with the transaction from all storage memory managed/controlled by the merchant central computer system 220 and/or merchant entity.

In step 217, the system receives the response message and, in step 216, whether the transaction is approved or declined is displayed on the user interface device to the customer and/or store associate. If the transaction is approved, the POS system 210 may print a load cash confirmation receipt for the customer. If the transaction is declined, the POS system 210 may offer to retry the load cash transaction and provide an option to return to step 213. After step 216, the system may automatically return to retail mode in step 211 or receive a user input to switch back to retail mode.

In some embodiments, one or more steps shown to be performed by the POS system 210 in FIG. 2 may be performed instead by or jointly with the merchant central computer system 220. In some embodiments, one or more steps shown to be performed by the merchant central computer system 220 in FIG. 2 may be performed instead by or jointly with the POS system 210. In some embodiments, the POS system 210 may comprise a thin client of the merchant central computer system 101 or a stateless machine in which steps 211-218 may be carried out by the merchant central computer system 220. In some embodiments, the merchant central computer system 220 may perform multiple instances of steps 221-224 to support a plurality of POS systems and communicate with a plurality of authorizers and/or financial institutions simultaneously.

Figure 3A:
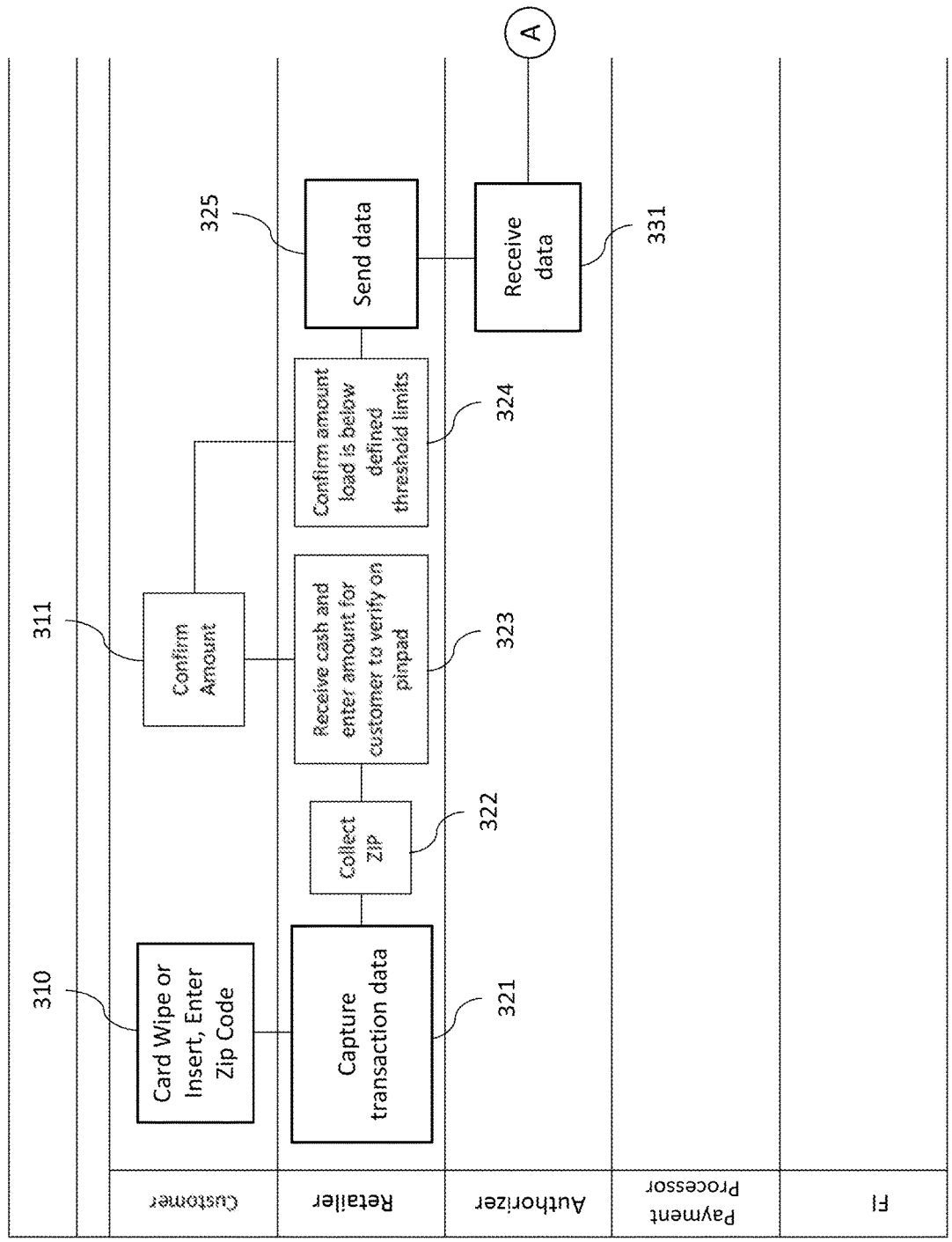
FIGS. 3A and 3B includes a process diagram in accordance with several embodiments.
Figure 3B:
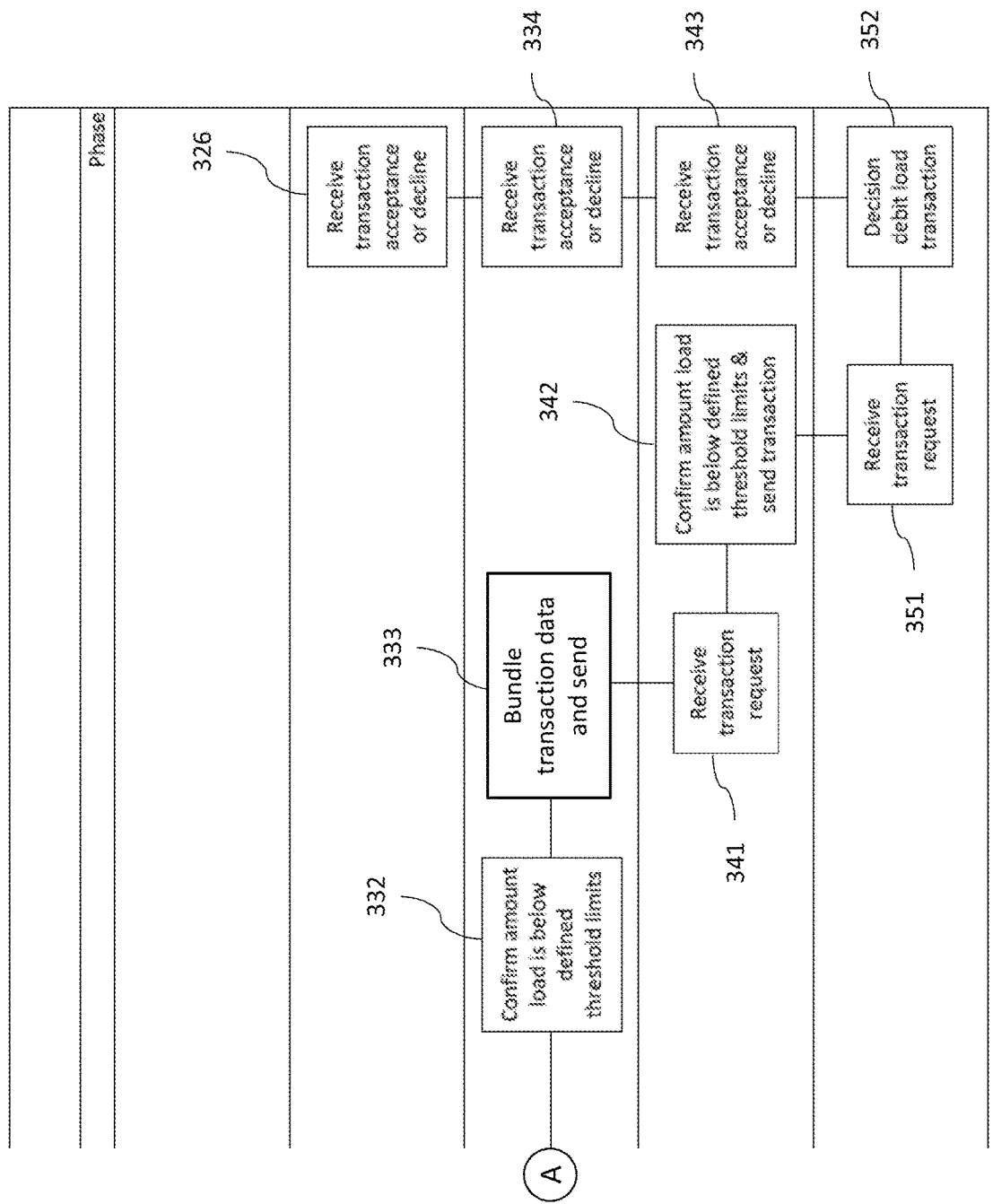

Referring now to FIGS. 3A-B, a process for loading cash to a customer account at a POS system is shown. The process shown in FIGS. 3A-B corresponds to one example of a process for loading cash through a POS and variations may occur in one or more steps without departing from the spirit of the present disclosure. In FIGS. 3A-B, the customer generally refers to the debit cardholder and/or the person requesting the load cash transaction at the POS. The retailer generally refers to a retail entity operating the POS system and the retail facility in which the POS system is located. The retail entity is generally a separate entity from the authorizer, the payment processor, and the financial institution (FI). The payment processor may refer to another third-party service that provides settlement services with financial institutions. Examples of a payment processor include Visa and Master. The financial institution generally refers to a bank or a credit union that provides banking services to businesses and individuals. In some embodiments, the financial institution may correspond to the issuing bank of the debit card and/or the bank at which the customer account associated with the debit card is opened.

In step 310, the customer initiates the transaction by swiping a debit card and entering a zip code. In some embodiments, debit card information may instead be received via a smart chip or an NFC tag. In some embodiments, the transaction may not require the customer to enter a zip code. In step 321, the retailer captures debit card information from the debit card, the captured information may include one or more of first name, last name, primary account number (PAN), and expiration date associated with the debit card. In step 322, additional information (e.g. ZIP code) is collected directly from the customer or a database. In step 323, the retailer receives cash and the cash amount is entered and verified by the customer via a pin pad. In step 311, the customer confirms the amount. In step 324, the retailer confirms that the amount to load is below a defined threshold limit. In some embodiments, the threshold limit may correspond to a retailer-imposed limit, financial institution-imposed limit, and/or a banking regulation imposed limit. In some embodiments, the threshold limit may correspond to the cash amount per load cash transaction, per day, per week, per month, etc. In step 325, the retailer sends the data collected to an authorizer. In some embodiments, the data collected may be sent via a standardized financial network message format (e.g. ISO 8583). In some embodiments, other request formats may be used with the systems and methods described herein.

In step 331, the authorizer receives the transaction data from the retailer. In step 332, the authorizer confirms that the amount to load is below a defined threshold limit. In some embodiments, the threshold limit may correspond to an authorizer-imposed limit, financial institution imposed limit, and/or a banking regulation imposed limit. In some embodiments, the threshold limit may correspond to the cash amount per load transaction, per day, per week, per month, etc. In step 333, the authorizer bundles transaction data and sends the data to a payment processor.

In step 341, the payment processor receives the transaction request from the authorizer. In step 342, the payment processor confirms that the amount to load is below a defined threshold limit and sends the transaction to the financial institution. In some embodiments, the threshold limit may correspond to a payment processor-imposed limit, a financial institution imposed limit, and/or a banking regulation imposed limit.

In step 351, the financial institution receives the transaction request. In step 352, the financial institution makes a decision on the debit load transaction. In step 343 the transaction acceptance or decline message is received at the payment processor and forwarded to the authorizer. In step 334, the message is received at the authorizer and forwarded to the retailer. At step 326, the retailer receives the transaction acceptance or decline message and may communicate to the customer whether the transaction has been accepted or declined via a POS system.

In some embodiments, if the amount load exceeds the threshold limit at step 324, 332, or 342, a transaction decline message may be sent to the retailer and/or customer without proceeding further in the process shown.

Figure 4A:
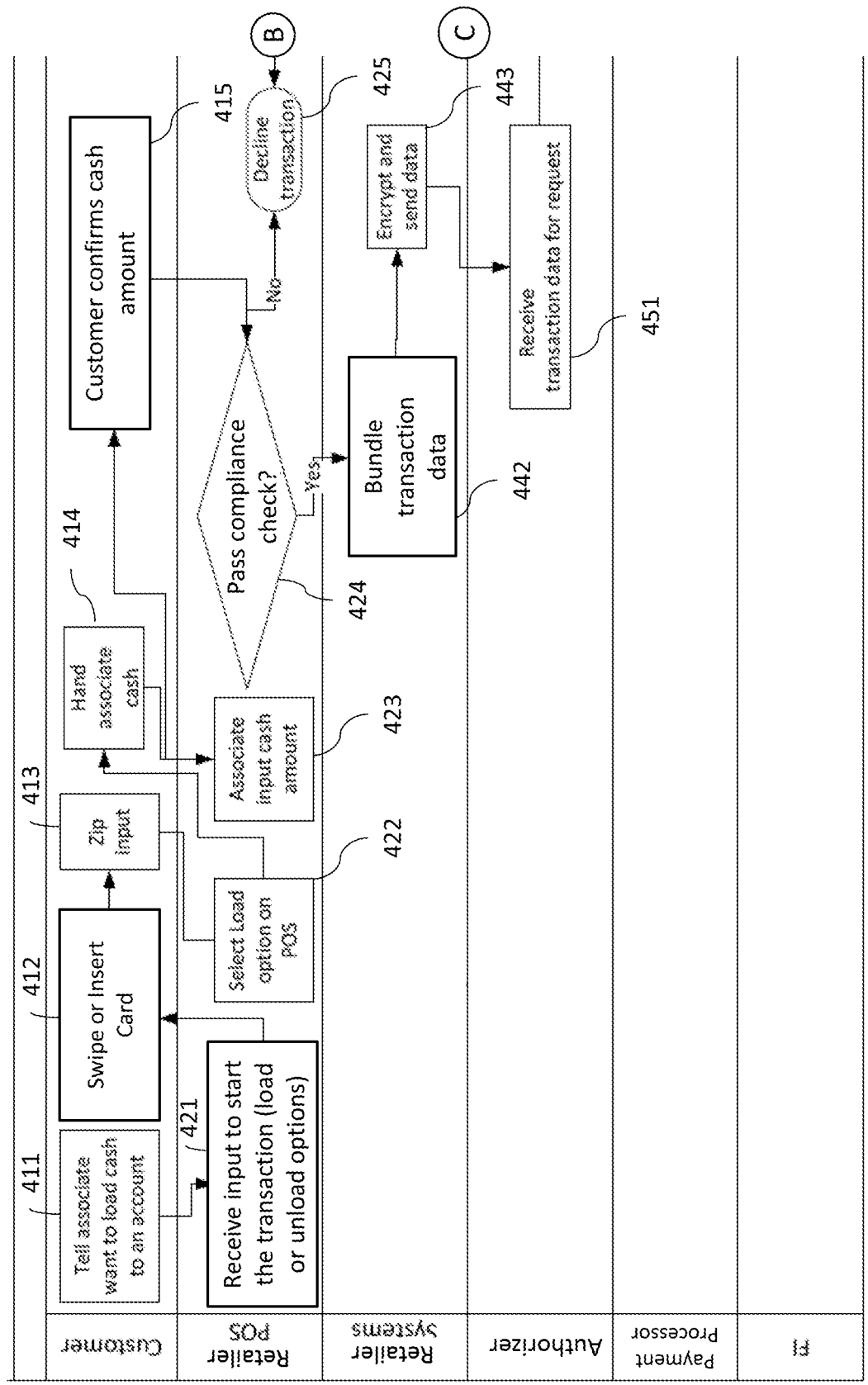
FIGS. 4A, 4B, and 4C include another process diagram in accordance with several embodiments.
Figure 4B:
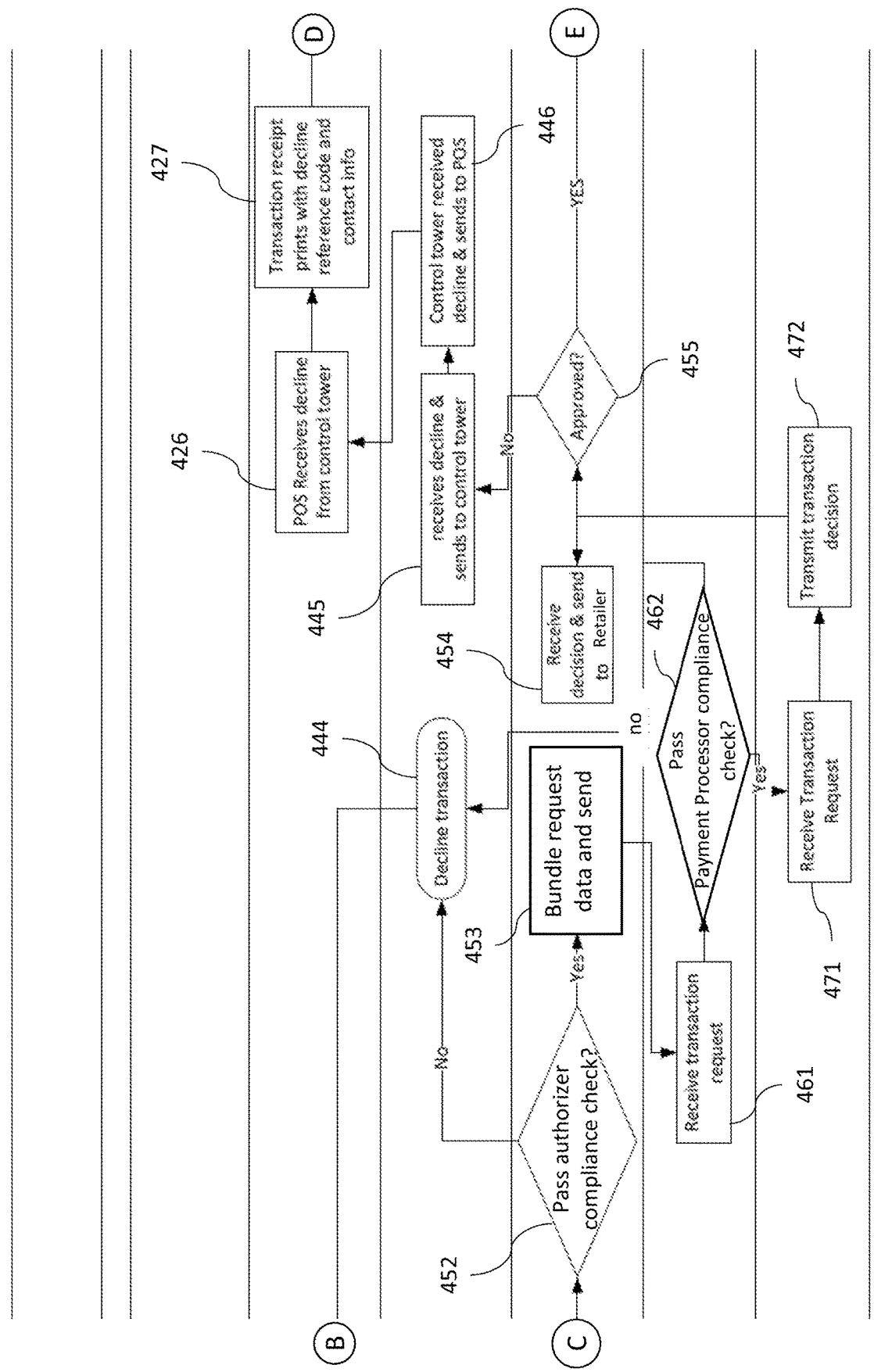
Figure 4C:
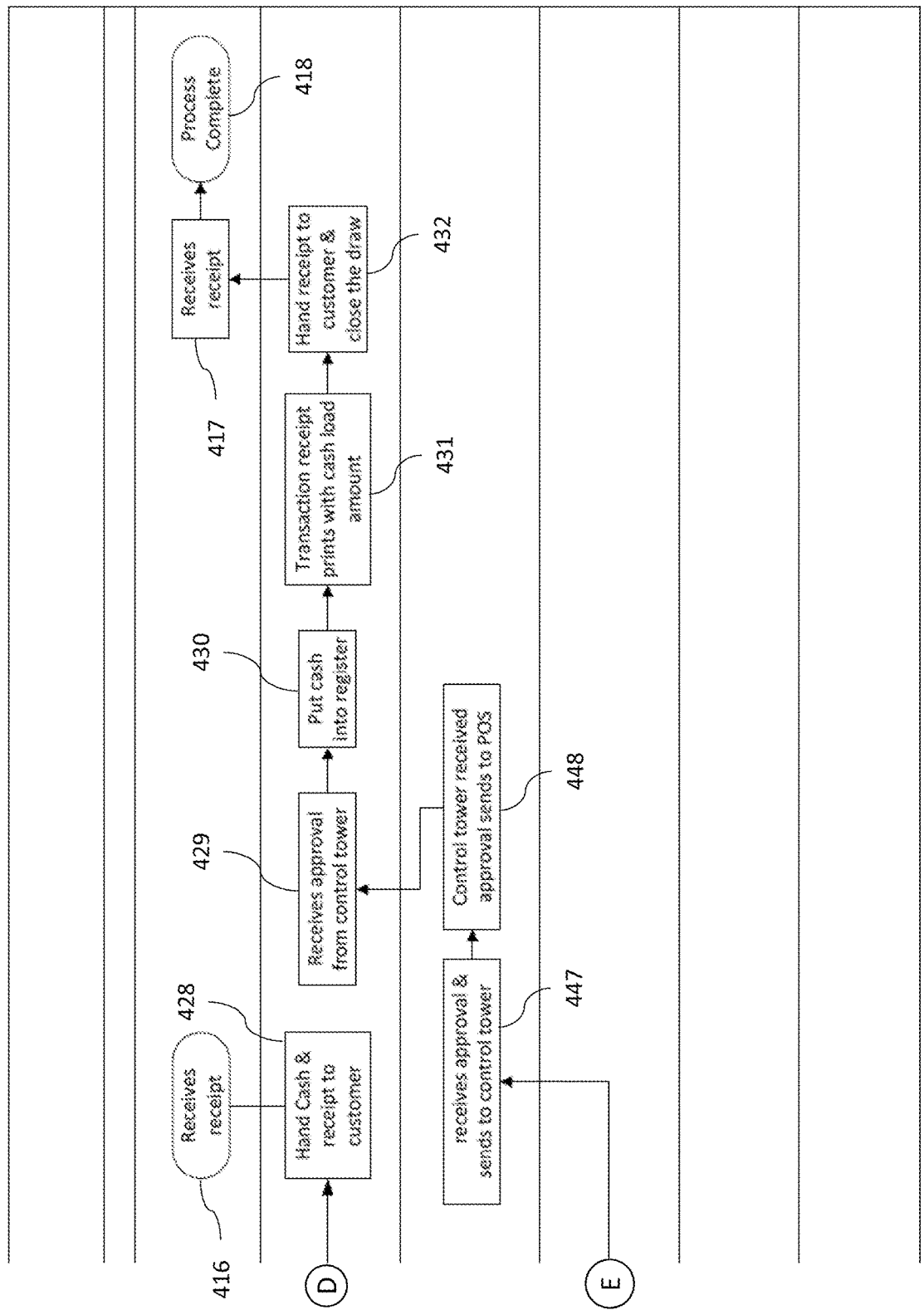

Referring now to FIGS. 4A-C, a process for loading cash to a customer account at a POS system is shown. The process shown in FIGS. 4A-C represents one example of a process for loading cash through a POS and variations may occur in one or more steps without departing from the spirit of the present disclosure. In FIGS. 4A-C, the customer generally refers to the debit cardholder and/or the person requesting the load cash transaction at the POS. The retailer POS generally refers to a POS system operated by a retail entity and may be located on the sales floor of a retail facility. In some embodiments, the POS system may comprise a cash register manned by an associate or a self-service checkout terminal. The retailer system generally refers to a central computer system and/or retailer backend system that supports the POS system and communicates with a financial network to facilitate financial transactions. The authorizer may refer to a third-party service provider that provides authorization and settlement services to the retailer. The payment processor may refer to another third-party service that provides settlement services with financial institutions. The financial institution generally refers to a bank or credit union that provides banking services to businesses and individuals. In some embodiments, the financial institution may correspond to the issuing bank of the debit card and/or the bank at which the account associated with the debit card is opened. Generally, the retailer, the authorizer, the payment processor, and the financial institution may each be a separate legal entity.

In step 411, the customer tells a store associate that they want to load cash to an account. The account may be a bank or credit union account that is owned or jointly owned by the customer. Generally, the account is tied to a debit card presented by the customer and may be a checking account, a savings account, a money market account, etc. In step 421, the store associate operates the POS to brings up a financial services user interface for loading and/or unloading cash. In step 412, the customer swipes the debit card. In some embodiments, the system may prompt the customer to swipe the card if they insert the card into a smart chip slot or vice versa. In step 413, the customer also enters their ZIP Code via a keypad or a touch screen. In some embodiments, the POS further triggers an item file based on the debit card information for the financial institution that supports the financial services provided at the retailer POS.

In step 422, the load option on the POS is selected. In step 414, the customer hands cash over to an associate. In step 423, the associate inputs the cash amount received, and the customer confirms the cash amount in step 415.

In step 424, the POS determines whether the cash amount is less than a limit threshold for loading cash into the customer account. If the amount exceeds the threshold, the transaction is declined and terminates at step 425. If the amount is less than the limit threshold, in step 442, the retailer system bundles data using an ISO message format, such as a modified rapid reload ISO. In step 443, data is encrypted and sent to an authorizer.

In step 451, the authorizer receives transaction data from the retailer for the load cash request. In step 452, the authorizer determines whether the load amount is less than the FI/BIN authorized limit threshold. If the cash amount exceeds the threshold, the transaction is declined, and the process terminates at step 444. If the amount is less than the limit threshold, the authorizer bundles request data and send the data to a payment processor in step 453.

In step 461, the payment processor receives the transaction request. In step 462, the payment processor determines whether the amount is less than the limit threshold. If the amount exceeds the threshold, the transaction is declined, and the process terminates in step 444. If the amount is less than the threshold, the load request is sent to the FI. In step

471, the FI receives the transaction request and makes a transaction decision in step 472. In step 454, the authorizer receives the decision and sends the decision to the retailer.

In step 445, if the transaction is not approved, the retailer system receives the decline message and sends the message to a control tower (e.g. central computer system). In step 446, the control tower then forwards the decline message to the POS. In step 426, the POS receives the decline message from the control tower. In step 427, the POS system prints a transaction receipt with a decline reference code and contact information for customer support. In step 428, the associate hands cash and the receipt to the customer and, in step 416, the process terminates upon the customer receiving the decline receipt.

If the transaction is approved in step 455, in step 447, the retailer system receives the approval. In step 448, the approval message is sent to the POS. In step 429, the POS receives the approval message from the control tower. In step 430, the store associate puts the received cash into the register. In step 431, the POS prints a transaction receipt with the cash load amount. In step 432, the store associate hands the receipt to the customer and closes the cash register drawer. In step 417, the customer receives the receipt and the process completes at step 418.

In some embodiments, with the system and process described herein, a retail customer may utilize a POS system at a retail facility to load cash into their bank accounts without making a separate trip to the bank or an ATM. In some embodiments, once the FI authorizes the transaction, the fund may be made immediately available to the customer in the account.

In some embodiments, the systems and methods described herein provide for a funds transfer solution that allows customers with bank accounts to add cash to their bank account by swiping their bank-issued debit card at any register in a retail store. The systems and methods described herein may be bank agnostic. That is, the systems herein may be implemented using an account at any bank or financial institution that participates in the system can participate in the cash deposit system. Customers affiliated with participating banks can simply swipe their debit card, provide the cash at the point-of-sale system at the retail store, and have the funds deposited in their bank account.

In one embodiment, a system for facilitating financial services comprises a retail central computer system comprising a control circuit and a memory device; and a point of sale (POS) system comprising a user interface device and a card reader, the POS system being configured to receive, from the user interface device, an input to switch the POS system of a retail entity from a retail mode to a financial services mode, display a financial services user interface on the user interface device of the POS system, receive, from the card reader, debit card information from a debit card associated with an account of a customer, the account being managed by a financial institution separate from the retail entity, display a cash amount to load into the account via the user interface device for confirmation, and transmit the debit card information and the cash amount to the retail central computer system and remove the debit card information from a memory of the POS system, display a transaction declined message or a transaction approved message in the financial services user interface based on a response message received from the retail central computer system, and exit the financial services mode and return to the retail mode to process purchases. The retail central computer system is configured to: encrypt the debit card information received from the POS system and generate a load cash request message and remove the debit card information from the memory device after encrypting the debit card information.

In one embodiment, a method for facilitating financial services at a point of sale (POS) system comprises receiving, via a user interface device of the POS system of a retail entity, an input to switch the POS system from a retail mode to a financial services mode, displaying a financial services user interface on the user interface device of the POS system, receiving, from a card reader of the POS system, debit card information from a debit card associated with an account of a customer, the account being managed by a financial institution separate from the retail entity, displaying a cash amount via the user interface device for confirmation, transmitting the debit card information and the cash amount from the POS system to a retail central computer system and remove the debit card information from a memory of the POS system, encrypting, at the retail central computer system, the debit card information received from the POS system and generating a load cash request message, and removing the debit card information from a memory device of the retail central computer system after encrypting the debit card information, displaying, with at the user interface device of the POS system, a transaction declined message or a transaction approved message via the financial services user interface based on a response message received from the retail central computer system, and exiting the financial services mode of the POS system and returning to the retail mode of the POS system to process purchases.

In one embodiment, an apparatus for facilitating financial services at a point of sale (POS) system comprises a non-transitory storage medium storing a set of computer readable instructions and a control circuit configured to execute the set of computer readable instructions which cause to the control circuit to receive, via a user interface device of the POS system of a retail entity, an input to switch the POS system from a retail mode to a financial services mode, display a financial services user interface on the user interface device of the POS system, receive, from a card reader of the POS system, debit card information from a debit card associated with an account of a customer, the account being managed by a financial institution separate from the retail entity, display a cash amount via the user interface device for confirmation, transmit the debit card information and the cash amount from the POS system to a retail central computer system and remove the debit card information from a memory of the POS system, encrypt, at the retail central computer system, the debit card information received from the POS system and generate a load cash request message, and remove the debit card information from a memory device of the retail central computer system after encrypting the debit card information, display, with at the user interface device of the POS system, a transaction declined message or a transaction approved message via the financial services user interface based on a response message received from the retail central computer system, and exit the financial services mode of the POS system and return to the retail mode of the POS system to process purchases.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for facilitating financial services comprising:
   a retail central computer system comprising a control circuit and a memory device; and
   a point of sale (POS) system comprising a user interface device and a card reader, the POS system being configured to:
      receive, from the user interface device, an input to switch the POS system of a retail entity from a retail mode to a financial services mode;
      display a financial services user interface on the user interface device of the POS system;
      receive, from the card reader, debit card information from a debit card associated with an account of a customer, the account being managed by a financial institution separate from the retail entity;
      display a cash amount to load into the account via the user interface device for confirmation, wherein the cash amount corresponds to cash received at the POS system for depositing into the account associated with the debit card;
      transmit the debit card information and the cash amount to the retail central computer system and remove the debit card information from a memory of the POS system;
      display a transaction declined message or a transaction approved message in the financial services user interface based on a response message received from the retail central computer system; and
      exit the financial services mode and return to the retail mode; and
      identify items in a retail store and process a retail purchase of the items while in the retail mode;
   wherein and the retail central computer system is configured to:
      encrypt the debit card information received from the POS system and generate a load cash request message; and
      remove the debit card information from the memory device after encrypting the debit card information.

2. The system of claim 1, wherein the POS system is further configured to:
   cause the user interface device to request additional information associated with the debit card information; and
   send the additional information to the retail central computer system.

3. The system of claim 2, wherein the POS system is further configured to:
   determine the additional information to request from the customer based on a Bank Identification Number in the debit card information.

4. The system of claim 1, wherein the card reader comprises one or more of a magnetic stripe reader and a smart card chip reader.

5. The system of claim 1, wherein the POS system further comprises:
   a cash conveyer device configured to determine the cash amount based on cash received from the customer to load into the account.

6. The system of claim 1, wherein the POS system is a manned cash register or a self-service checkout terminal.

7. The system of claim 1, wherein the retail central computer system is configured to:
   send the load cash request message to a transaction authorizer partnered with the financial institution; and
   receive a response from the transaction authorizer and determine whether the load cash request message is approved or declined based on the response.

8. The system of claim 1, wherein the retail central computer system is configured to:
   send the load cash request message to the financial institution; and
   receive a response from the financial institution and determine whether the load cash request message is approved or declined based on the response.

9. The system of claim 1, wherein the retail central computer system is further configured to:
   retrieve additional information associated with the debit card information from a customer database storing customer information; and
   include the additional information in the load cash request message sent to a transaction authorizer or the financial institution.

10. The system of claim 1, wherein the retail central computer system is further configured to:
    verify compliance of loading the cash amount to the account of the customer based on the cash amount.

11. A method for facilitating financial services at a point of sale (POS) system comprising:
    receiving, via a user interface device of the POS system of a retail entity, an input to switch the POS system from a retail mode to a financial services mode;
    displaying a financial services user interface on the user interface device of the POS system;
    receiving, from a card reader of the POS system, debit card information from a debit card associated with an account of a customer, the account being managed by a financial institution separate from the retail entity;
    displaying a cash amount via the user interface device for confirmation, wherein the cash amount corresponds to cash received at the POS system for depositing into the account associated with the debit card;
    transmitting the debit card information and the cash amount from the POS system to a retail central computer system and remove the debit card information from a memory of the POS system;
    encrypting, at the retail central computer system, the debit card information received from the POS system and generating a load cash request message; and
    removing the debit card information from a memory device of the retail central computer system after encrypting the debit card information;
    displaying, with at the user interface device of the POS system, a transaction declined message or a transaction approved message via the financial services user interface based on a response message received from the retail central computer system;
    exiting the financial services mode of the POS system and returning to the retail mode of the POS system; and
    identifying, at the POS system, items in a retail store and processing a retail purchase of the items while in the retail mode.

12. The method of claim 11, further comprising:
    causing the user interface device to request additional information associated with the debit card information; and
    sending the additional information to the retail central computer system.

13. The method of claim 12, further comprising:
    determining the additional information to request from the customer based on a Bank Identification Number in the debit card information.

14. The method of claim 11, wherein the card reader comprises one or more of a magnetic stripe reader and a smart card chip reader.

15. The method of claim 11, wherein the POS system further comprises a cash conveyer device configured to determine the cash amount based on cash received from the customer.

16. The method of claim 11, further comprising:
sending, from the retail central computer system, the load cash request message to a transaction authorizer partnered with the financial institution; and
receiving a response from the transaction authorizer and determining whether the load cash request message is approved or declined based on the response.

17. The method of claim 11, further comprising:
sending, from the retail central computer system, the load cash request message to the financial institution; and
receiving a response from the financial institution and determining whether the load cash request message is approved or declined based on the response.

18. The method of claim 11, further comprising:
retrieving, at the retail central computer system, additional information associated with the debit card information from a customer database storing customer information; and
including the additional information in the load cash request message.

19. The method of claim 11, further comprising:
verify compliance of loading the cash amount to the account of the customer based on the cash amount.

20. An apparatus for facilitating financial services at a point of sale (POS) system comprising:
a non-transitory storage medium storing a set of computer readable instructions; and
a control circuit configured to execute the set of computer readable instructions which cause to the control circuit to:
receive, via a user interface device of the POS system of a retail entity, an input to switch the POS system from a retail mode to a financial services mode;
display a financial services user interface on the user interface device of the POS system;
receive, from a card reader of the POS system, debit card information from a debit card associated with an account of a customer, the account being managed by a financial institution separate from the retail entity;
display a cash amount via the user interface device for confirmation, wherein the cash amount corresponds to cash received at the POS system for depositing into the account associated with the debit card;
transmit the debit card information and the cash amount from the POS system to a retail central computer system and remove the debit card information from a memory of the POS system;
encrypt, at the retail central computer system, the debit card information received from the POS system and generate a load cash request message; and
remove the debit card information from a memory device of the retail central computer system after encrypting the debit card information;
display, with at the user interface device of the POS system, a transaction declined message or a transaction approved message via the financial services user interface based on a response message received from the retail central computer system;
exit the financial services mode of the POS system and return to the retail mode of the POS system to process purchases; and
identify items in a retail store and process a retail purchase of the items while in the retail mode.

* * * * *